(12) United States Patent
Ito et al.

(10) Patent No.: US 7,876,405 B2
(45) Date of Patent: Jan. 25, 2011

(54) REFLECTIVE SPATIAL LIGHT MODULATOR

(75) Inventors: Haruyasu Ito, Hamamatsu (JP); Yasushi Ohbayashi, Hamamatsu (JP); Norihiro Fukuchi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 120 days.

(21) Appl. No.: 12/327,259

(22) Filed: Dec. 3, 2008

(65) Prior Publication Data

US 2009/0147161 A1    Jun. 11, 2009

(30) Foreign Application Priority Data

Dec. 5, 2007    (JP)    ............... P2007-315066

(51) Int. Cl.
   *G02F 1/1335*    (2006.01)
(52) U.S. Cl. ..................................... 349/113
(58) Field of Classification Search ............ 349/15, 349/95, 462, 25, 113; 353/33
   See application file for complete search history.

(56) References Cited

U.S. PATENT DOCUMENTS 7,697,080 B2 *    4/2010    Mather et al. ............ 349/15

2009/0103053 A1 *    4/2009    Ichikawa et al. ............ 353/33

FOREIGN PATENT DOCUMENTS

| JP | 8-234157 | 9/1996 |
| JP | 2002-506230 | 2/2002 |
| JP | 2005-345736 | 12/2005 |
| JP | 2006-68762 | 3/2006 |
| WO | WO 03/034133 | 4/2003 |

OTHER PUBLICATIONS

J. Stockley et al., "Liquid crystal spatial light modulator for multispot beam steering," Proc. of SPIE, vol. 5160, 2004, pp. 208-215.

* cited by examiner

*Primary Examiner*—Akm E Ullah
(74) *Attorney, Agent, or Firm*—Drinker Biddle & Reath LLP (57) ABSTRACT

The present invention relates to a reflective spatial light modulator enabling improvement of light resistance and prevention of damaging of the liquid crystal layer. The reflective spatial light modulator controls phases of the incident light and a reflected light while reflecting light made incident from a front side, and comprises a liquid crystal layer, a dielectric multilayer film, and a phase shift layer. The liquid crystal layer is filled with a liquid crystal comprised of a light modulating material, and modulates the incident light. The dielectric multilayer film reflects the incident light. The phase shift layer is disposed between the liquid crystal layer and the dielectric multilayer film to shift phases of the incident light and the reflected light at an interface of the liquid crystal layer.

4 Claims, 9 Drawing Sheets

Fig.9 ically  below  and  the  specific  examples,  while  indicating preferred  embodiments  of  the  invention,  are  given  by  way  of illustration  only,  since  various  changes  and  modifications within  the  spirit  and  scope  of  the  invention  will  be  apparent to  those  skilled  in  the  art  from  this  detailed  description.

REFLECTIVE SPATIAL LIGHT MODULATOR

BACKGROUND OF THE INVENTION

1. Field of the Invention

The present invention relates to a reflective spatial light modulator.

2. Related Background Art

An art of modulating laser light by a liquid crystal reflective spatial light modulator (LCOS-SLM: Liquid Crystal On Silicon-Spatial-Light Modulator) has been conventionally known. For example, a laser processing apparatus including a liquid crystal reflective spatial light modulator is disclosed in Patent Document 1. With the laser processing apparatus described in Japanese Patent Application Laid-Open No. 2006-68762 (Document 1), a laser output from a femtosecond laser light source is homogenized in energy distribution and made incident homogeneously on an entire surface of the spatial light modulator to form a plurality of focus spots in an interior of a substance to be processed. With such a spatial light modulator, a reflecting layer is disposed opposite a liquid crystal layer and light transmitted through the liquid crystal layer is reflected by the reflecting layer.

SUMMARY OF THE INVENTION

The present inventors have examined conventional spatial light modulators, and as a result, have discovered the following problems. That is, in the case that high intensity laser light with a high peak intensity, such as a femtosecond laser, is made incident on a spatial light modulator, a liquid crystal layer present near a reflecting surface may become damaged. In the invention described in Patent Document 1, by providing an external element, such as a beam shaping element, the laser output is homogenized within an effective diameter of the light modulator to prevent damaging of the liquid crystal layer. However, with the reflective spatial light modulator described in Patent Document 1, despite the incident light being made incident upon being lowered in peak intensity by homogenization of the light intensity distribution, damaging of the liquid crystal layer near the reflecting surface could not be prevented.

The present invention has been developed to eliminate the problems described above. It is an object of the present invention to provide a reflective spatial light modulator enabling improvement of light resistance and prevention of damaging of the liquid crystal layer.

In order to resolve the above issue, the present inventors took note of a phenomenon occurring between a liquid crystal layer and high intensity laser light. As a result, it was found that one cause of damage of the liquid crystal layer is a multiphoton absorption occurring near an interface of the liquid crystal layer, and that the multiphoton absorption depends largely on a light intensity resulting from superimposition of an incident light made incident on a reflective spatial light modulator and a reflected light reflected by a reflecting layer. Then upon obtaining the knowledge that the damaging of the liquid crystal layer can be prevented by lessening the influence of such multiphoton absorption near the interface of the liquid crystal with the reflecting layer, the present inventors arrived at the present invention.

A reflective spatial light modulator according to the present invention controls phases of an incident light and a reflected light while reflecting the incident light from a front side, and comprises a light input/output surface through which the incident light and the reflected light pass from opposite directions. The reflective spatial light modulator further comprises a liquid crystal layer, a reflecting layer, and a phase shift layer. The liquid crystal layer is configured by filling a liquid crystal comprised of a light modulating material into a space between two alignment films which are positioned in succession along a propagating direction of the incident light having passed through the light input/output surface. The reflecting layer is arranged at a side opposite the light input/output surface with respect to the liquid crystal layer. The reflecting layer functions so as to reflect the incident light having passed through the liquid crystal layer, as reflected light propagating in the direction opposite the propagating direction of the incident light. Furthermore, the phase shift layer is arranged between the liquid crystal layer and the reflecting layer. The phase shift layer functions so as to shift phases of the incident light and the reflected light at an alignment film-liquid crystal interface (an interface between one of the alignment films and the liquid crystal in the liquid crystal layer; hereinafter, simply referred to as interface of liquid crystal layer).

As described above, it has been found by research by the present inventors that damaging of the liquid crystal layer is due to an influence of two-photon absorption, which is one type of multiphoton absorption. Two-photon absorption is a phenomenon where, by a substance absorbing two photons simultaneously, absorption corresponding to twice an illuminated energy occurs. In the conventional reflective spatial light modulator, two-photon absorption occurred as a result of superimposition of the incident light and the reflected light and damaged the liquid crystal layer. Meanwhile, in the reflective spatial light modulator according to the present invention, the phase shift layer is disposed between the liquid crystal layer and the reflecting layer. The phases of the incident light and the reflected light can thus be shifted in the phase shift layer to lessen the occurrence of two-photon absorption at the interface of liquid crystal layer. Thus, in accordance with the reflective spatial light modulator, even when a high intensity laser is made incident, damaging of the liquid crystal can be prevented.

In the reflective spatial light modulator according to the present invention, it is preferable that the phase shift layer has an optical film thickness of no less than a wavelength of the incident light. Also, when $\tau$ is a pulse width of the incident light and c is a speed of light, the phase shift layer preferably has an optical film thickness of no less than $(\tau \times c)/30$. In either of these configurations, two-photon absorption occurring near the interface of the liquid crystal layer can be lessened favorably.

Furthermore, in the reflective spatial light modulator according to the present invention, the phase shift layer and the reflecting layer constitute a part of a dielectric multilayer film in which three or more dielectric layers are laminated, and the dielectric multilayer film is preferably disposed so that a laminate direction of the dielectric layers is matched with the propagating direction of the incident light having passed through the liquid crystal. In this configuration, of the dielectric layers in the dielectric multilayer film, an upper dielectric layer positioned at a side closest to the liquid crystal layer preferably functions as the phase shift layer. On the other hand, the other dielectric layers excluding the upper dielectric layer preferably function as the reflecting layer. The reflecting layer and the phase shift layer can thereby be configured favorably.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

In the following, embodiments of a reflective spatial light modulator according to the present invention will be explained in detail with reference to FIGS. 1 to 9. In the description of the drawings, identical or corresponding components are designated by the same reference numerals, and overlapping description is omitted.

Figure 1:
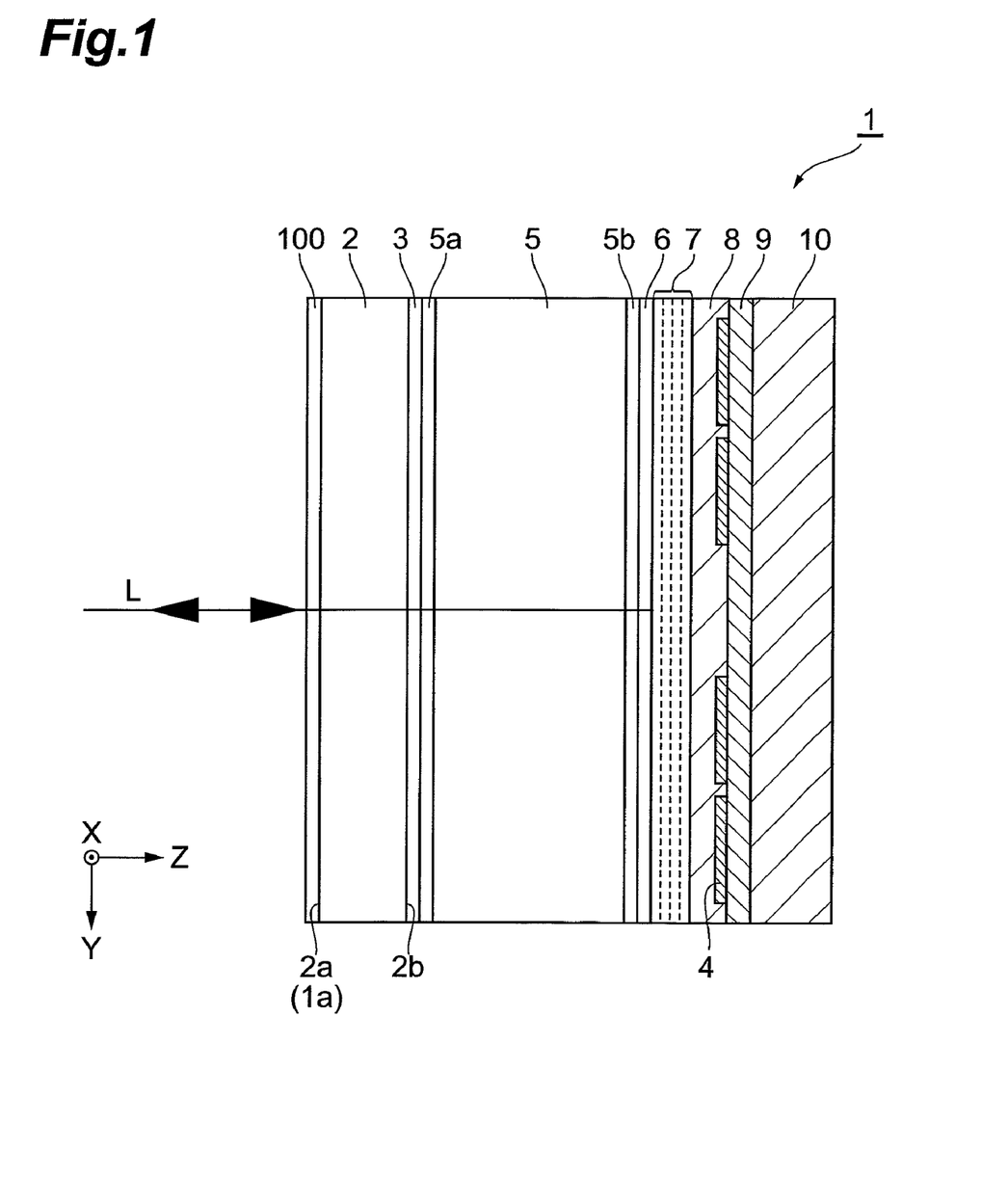
FIG. 1 is a sectional side view of one embodiment of a reflective spatial optical modulator according to the present invention.

FIG. 1 is a sectional side view of an embodiment of a reflective spatial optical modulator according to the present invention. The reflective spatial optical modulator 1 shown in FIG. 1 includes a glass substrate 2, a transparent conductive film 3, pixel electrodes 4, a liquid crystal layer 5, a transparent layer (phase shift layer) 6, a dielectric multilayer film (reflecting film) 7, and a light blocking layer 8.

A top surface 2a of the glass substrate 2 constitutes a light input/output surface 1a of the reflective spatial optical modulator 1, an anti-reflection film 100 is formed on the top surface 2a, and the glass substrate 2 transmits light L of a predetermined wavelength, made incident from the light input/output surface 1a of the reflective spatial optical modulator 1 into an interior of the reflective spatial optical modulator 1. The transparent conductive film 3 is formed on a rear surface 2b of the glass substrate 2 and is mainly composed of a conductive material (for example, ITO) that transmits the light L.

Figure 2:
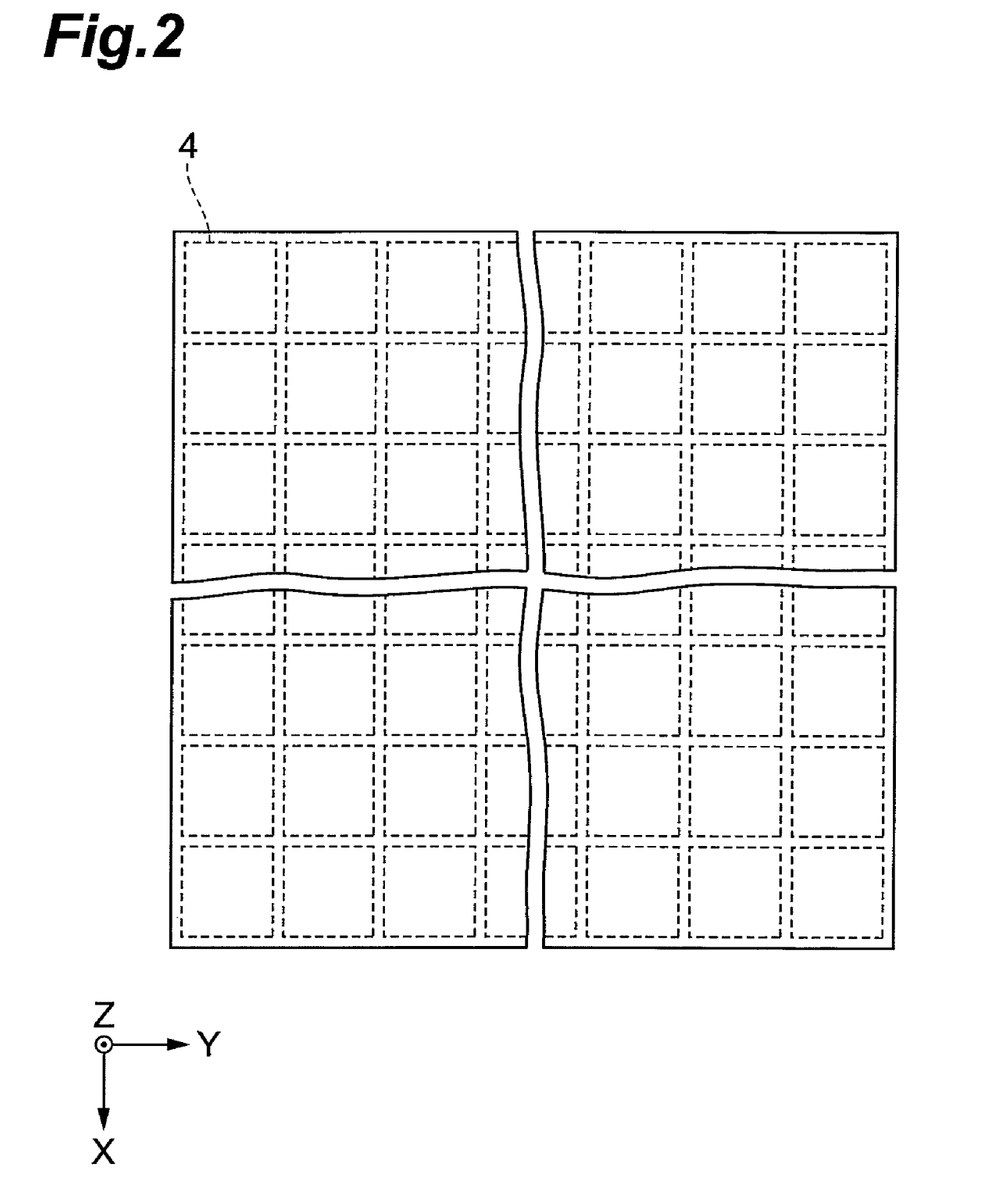
FIG. 2 is a plan view of a configuration of pixel electrodes.

As shown in FIG. 2, the pixel electrodes 4 are arrayed two-dimensionally and constitute respective pixels. Each pixel electrode 4 is composed of a metal material, such as aluminum, and a top surface thereof is processed to be flat and smooth. The plurality of pixel electrodes are driven by an active matrix circuit disposed in a drive circuit layer 9. The active matrix circuit is disposed between the pixel electrodes 4 and a silicon substrate 10 and controls application voltages to the respective pixel electrodes 4 according to an optical image to be output from the reflective spatial optical modulator 1. Such an active matrix circuit includes, for example, a first driver circuit, controlling application voltages of respective pixel columns aligned in an X-axis direction, and a second driver circuit, controlling application voltages of respective pixel rows aligned in a Y-axis direction, and is configured to apply predetermined voltages to pixel electrodes 4 of pixels designated by both driver circuits.

The liquid crystal layer 5 is disposed between the transparent conductive film 3 and the transparent layer 6 and modulates the light L according to electric fields formed by the respective pixel electrodes 4. That is, when a voltage is applied to a certain pixel electrode 4 by the active matrix circuit, an electric field is formed between the transparent conductive film 3 and the pixel electrode 4. This electric field is applied to the dielectric multilayer film 7 and the liquid crystal layer 5 respectively at proportions corresponding to the respective resistance. An orientation direction of liquid crystal molecules changes in accordance to the magnitude of the electric field applied to the liquid crystal layer 5. When the light L is transmitted through the glass substrate 2 and the transparent conductive film 3 and made incident on the liquid crystal layer 5, the light L is modulated by the liquid crystal molecules in a process of passing through the liquid crystal layer 5, and after being reflected by the dielectric multilayer film 7, is modulated again by the liquid crystal layer 5 and then taken out. In the present embodiment, the liquid crystal layer 5 includes alignment films 5a and 5b.

The alignment films 5a and 5b are formed at respective end faces of the liquid crystal layer 5 and align the group of liquid crystal molecules in a fixed direction. The alignment films 5a and 5b are composed of a polymer material, such as a polyimide, and films to which a rubbing treatment, etc. have been applied to the surfaces in contact with the liquid crystal layer 5 are applied.

The transparent layer 6 is the phase shift layer in the present embodiment. At an interface of the liquid crystal layer 5, the transparent layer 6 shifts phases so that peaks of the light L made incident from the glass substrate 2 side and the light L reflected by the dielectric multilayer film 7 do not become mutually superimposed. An optical film thickness of the transparent layer 6 is preferably set to no less than a wavelength of the incident light. Or, the optical film thickness of the transparent layer 6 is preferably set to no less than $(\tau \times c)/30$ where $\tau$ is a pulse width of the incident light and $c$ is a speed of light. Preferably $SiO_2$ or $Nb_2O_5$ is mainly contained as a constituent material of the transparent layer 6.

The dielectric multilayer film 7 is disposed between the transparent layer 6 and the light blocking layer 8. The dielectric multilayer film 7 reflects the light L at a high reflectance of, for example, over 99%. Although a material in which $SiO_2$ and $TiO_2$ are laminated alternatingly can be cited as an example of a constituent material of the dielectric multilayer film 7, the present embodiment is not restricted in particular thereto, and changes can be made as suited, for example by employing $HfO_2$ in place of $TiO_2$, and employing $MgF_2$ in place of $SiO_2$.

The light blocking layer 8 is disposed between the dielectric multilayer film 7 and the pixel electrodes 4 and is formed directly on the top surfaces of the pixel electrodes 4. The light blocking layer 8 suppresses leakage of light.

Actions of the reflective spatial optical modulator 1 with the above configuration shall now be described in detail.

Figure 3:
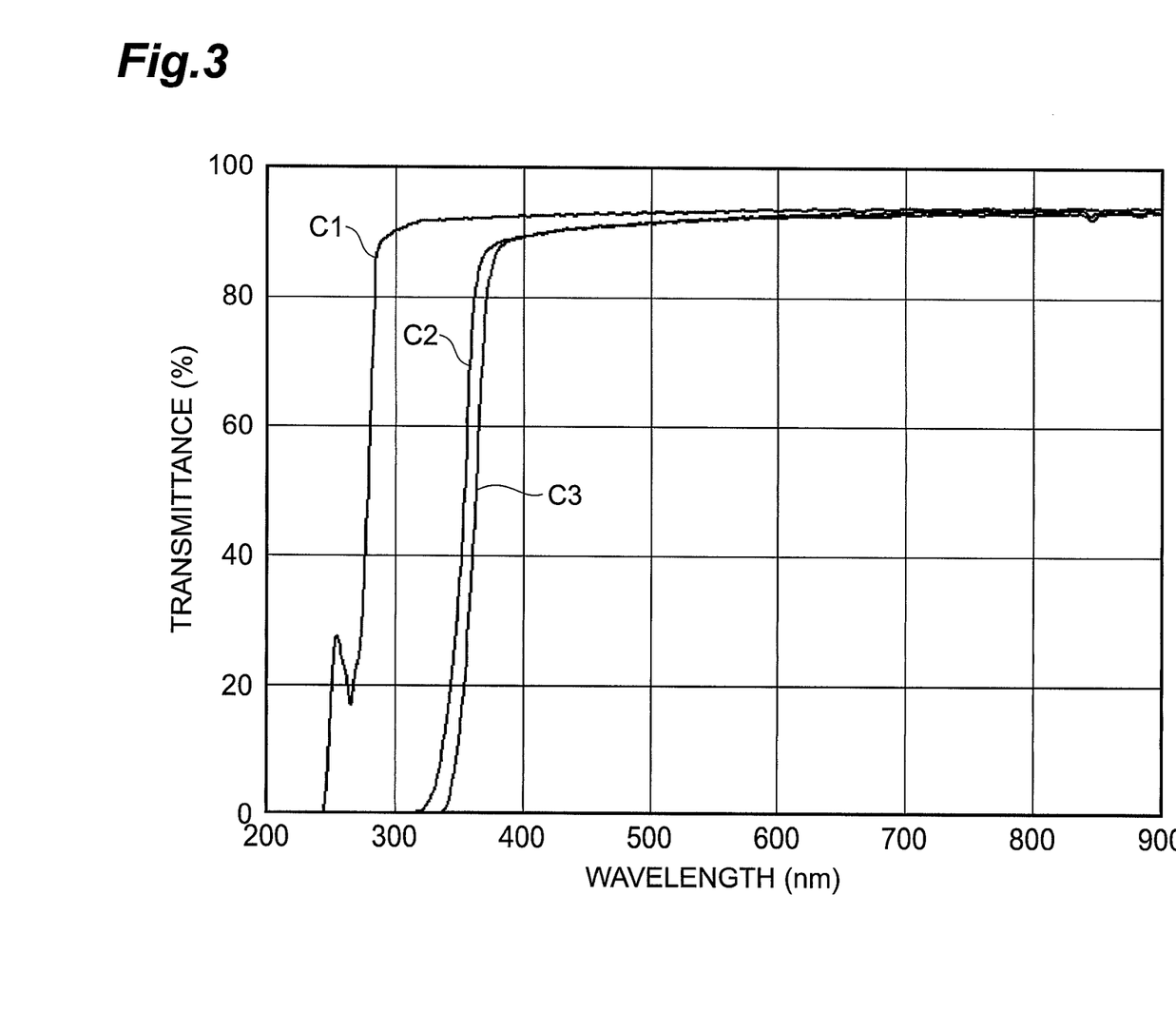
FIG. 3 is a diagram of spectroscopic transmission characteristics of respective types of liquid crystal.

First, spectroscopic transmission characteristics of respective types of liquid crystal are shown in FIG. 3. As shown in FIG. 3, the respective types of liquid crystals C1 to C3 are high in light transmittance in an oscillation wavelength band (700 nm to 1000 nm) of a Ti:sapphire laser widely used as a high intensity femtosecond laser. There are also liquid crystals, such as C1, that exhibit a strong absorption in a short wavelength band corresponding to ½ of the oscillation wavelength.

Figure 4:
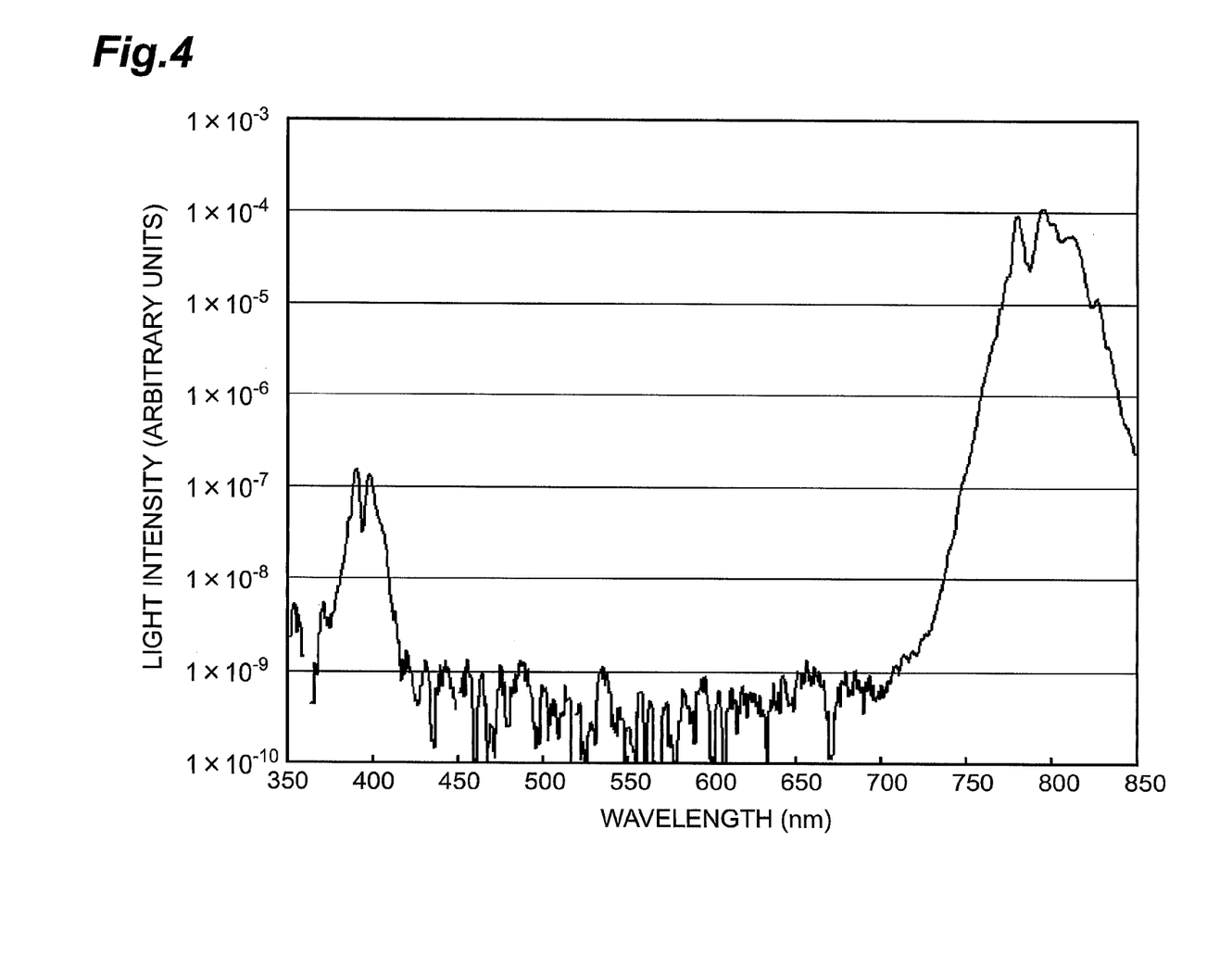
FIG. 4 is a spectrum of scattered light when a femtosecond laser is illuminated on a reflective spatial optical modulator using a liquid crystal.

Normally, absorption of light of 800 nm wavelength by a liquid crystal is low. However, when two-photon absorption, in which a liquid crystal absorbs two photons simultaneously, occurs, an energy corresponding to illumination of light of 400 nm at which the absorptivity is high is generated. FIG. 4 is a spectrum of scattered light when a femtosecond laser of 800 nm central wavelength and 1 kHz repetition frequency is illuminated on a reflective spatial optical modulator using the liquid crystal C3 shown in FIG. 3. As shown in FIG. 4, by the liquid crystal layer 5 simultaneously absorbing two photons of 800 nm wavelength by two-photon absorption, the same effect as that occurring when a single photon of 400 nm wavelength, which is high in absorptivity by the liquid crystal layer 5, is absorbed occurs.

Figure 5:
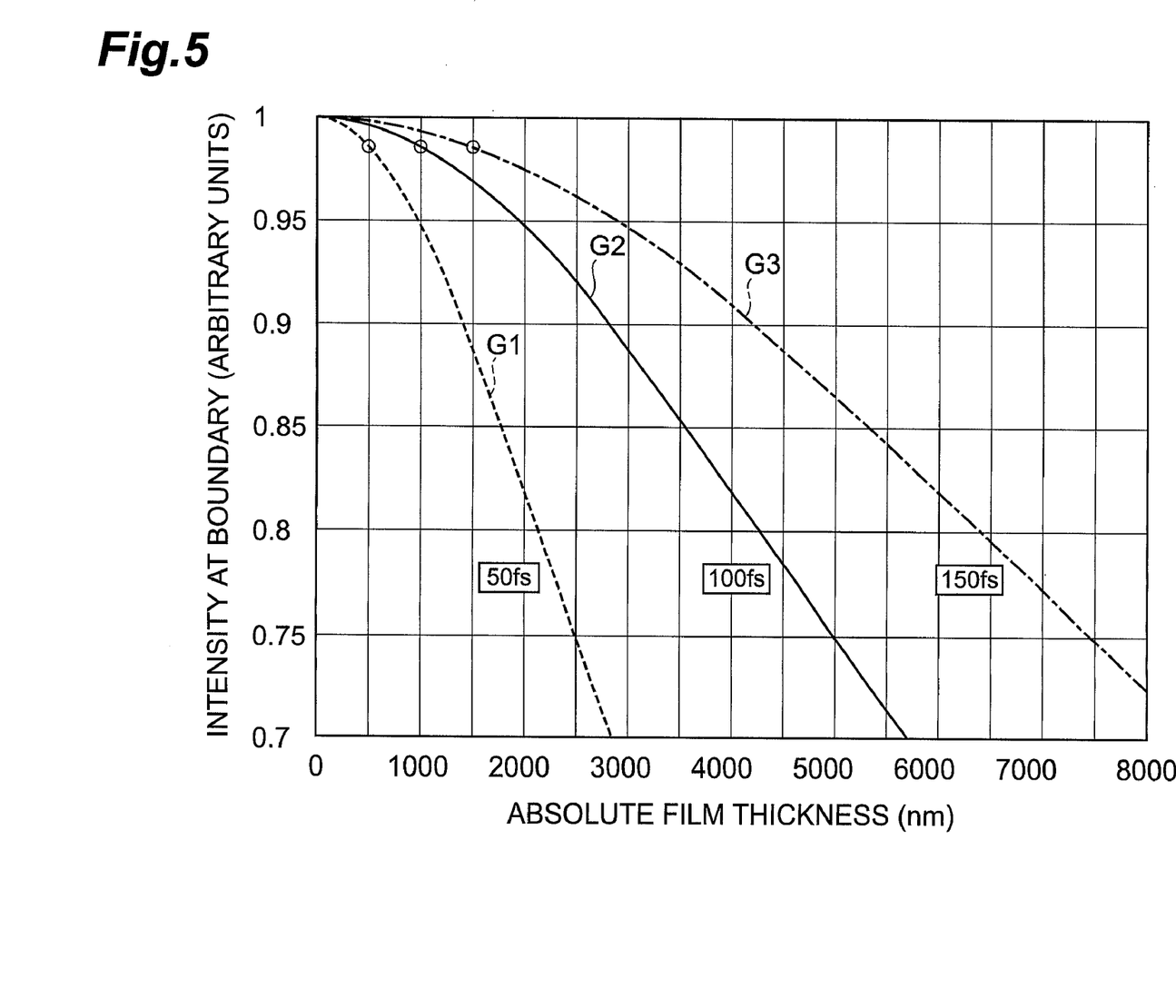
FIG. 5 shows a relationship of an optical film thickness of a transparent layer and a light intensity at an interface of a liquid crystal layer.

FIG. 5 shows a relationship of the optical film thickness of the transparent layer 6 and a light intensity at the interface of the liquid crystal layer 5. In FIG. 5, an abscissa indicates the optical film thickness (nm) of the transparent layer, and an ordinate indicates the light intensity (arbitrary units) at the interface of liquid crystal layer 5. The case of 0 nm optical film thickness of the transparent layer 6 is the case where the transparent layer 6 is not disposed. In regard to respective curves G1 to G3 shown in FIG. 5, G1 indicates the relationship in a case where the pulse width is 50 fs, G2 indicates the relationship in a case where the pulse width is 100 fs, and G3 indicates the relationship in a case where the pulse width is 150 fs. As a finding that can be obtained from FIG. 7, the light resistance of the device improves to a value enabling withstanding of a normal method of use when the optical film thickness of the transparent layer 6 is set to no less than $(\tau \times c)/30$ where $\tau$ is the pulse width of the incident light and c is the speed of light. When the respective pulse widths are substituted in this formula, the result is 500 nm in the case of 50 fs, 1000 nm in the case of 100 fs, and 1500 nm in the case of 150 fs, and the light intensity at the interface of the liquid crystal layer 5 in these cases becomes 0.98 times that of the case where there is no transparent layer 6. Here, because a frequency of occurrence of two-photon absorption is proportional to a square of the light intensity at the interface of the liquid crystal layer 5, the frequency of occurrence of two-photon absorption is reduced by $0.98^2=0.96$ times. The intensity of light is attenuated more the thicker the optical film thickness of the transparent layer 6 and shorter the pulse width.

Figure 6:
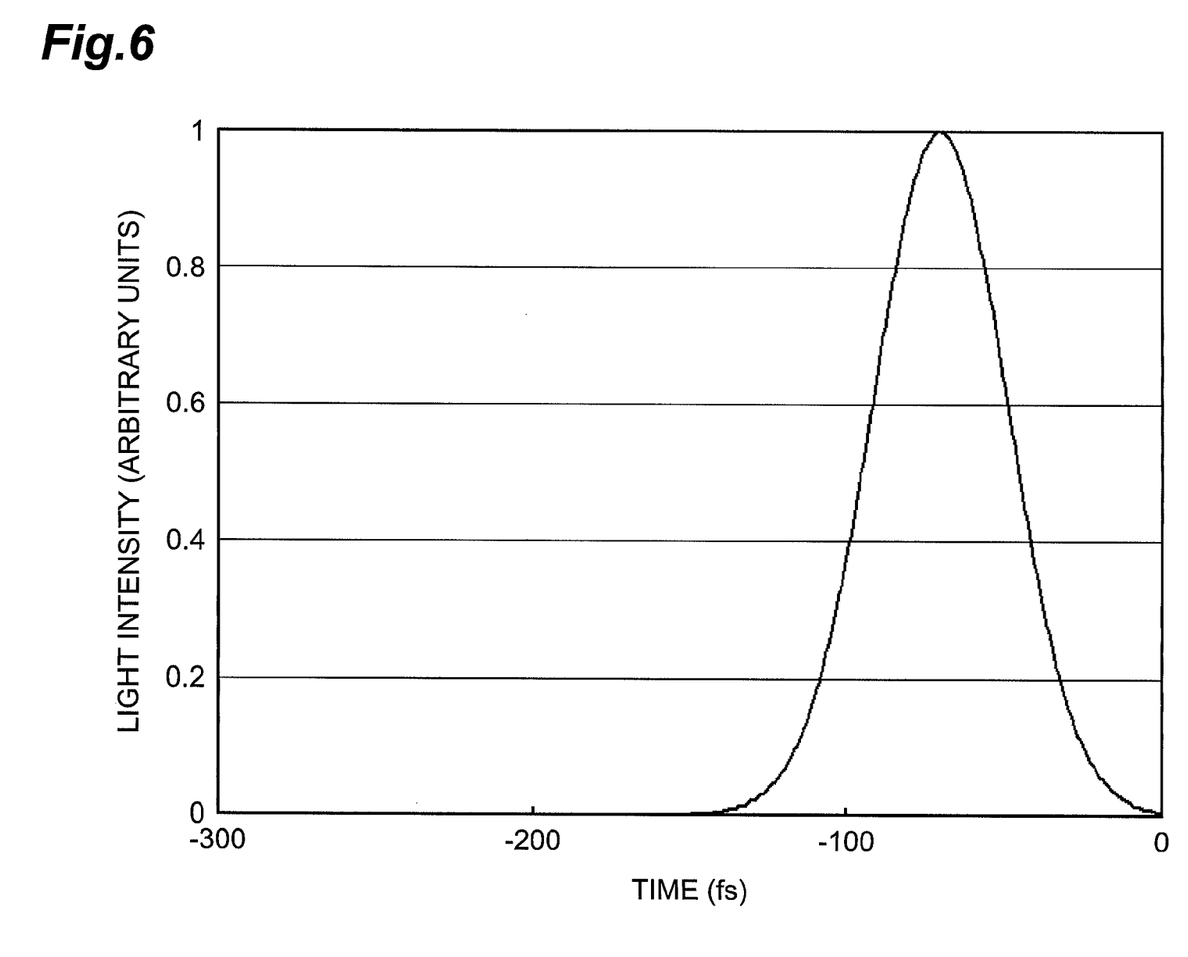
FIG. 6 shows a light intensity at a liquid crystal interface in a conventional reflective spatial light modulator.
Figure 7:
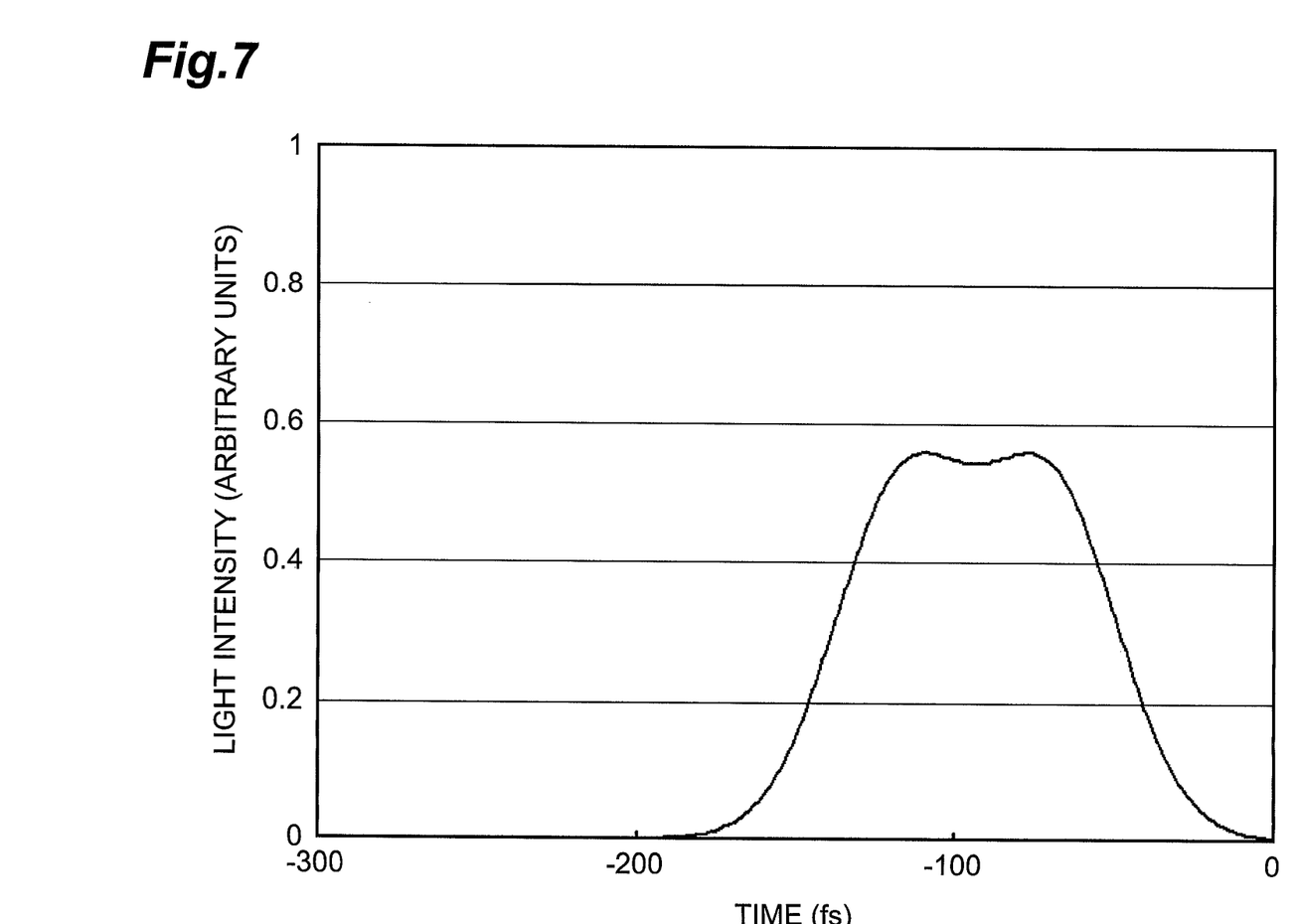
FIG. 7 shows a light intensity at a liquid crystal interface in the reflective spatial light modulator shown in FIG. 1.

FIGS. 6 and 7 are diagrams, each showing a light intensity at an interface of a liquid crystal layer when a light pulse of 50 fs pulse width is made incident on a reflective spatial light modulator. FIG. 6 shows the light intensity variation at the liquid crystal interface in a conventional reflective spatial light modulator in which the transparent layer 6 is not disposed. Meanwhile, FIG. 7 shows the light intensity variation at the interface of the liquid crystal layer 5 in the reflective spatial light modulator 1 having the transparent layer 6 composed of $Nb_2O_5$ of 3 μm optical film thickness disposed between the liquid crystal layer 5 and the dielectric multilayer film 7. As shown in FIG. 7, with the reflective spatial light modulator 1 according to the present invention, the light intensity peak at the interface of liquid crystal layer 5 is lessened in comparison to the case where there is no transparent layer 6 and the light intensity peak at the interface of the liquid crystal layer 5 is reduced by 0.55 times. The frequency of occurrence of two-photon absorption is thereby reduced by $0.55^2=0.3$ times.

The reflective spatial light modulator 1 according to the embodiment described above exhibits the following effect. In the reflective spatial light modulator 1, because the transparent layer 6 is formed between the liquid crystal layer 5 and the dielectric multilayer film 7, two-photon absorption due to superimposition of the incident light and the reflected light at the interface of the liquid crystal layer 5 can be lessened.

Figure 8:
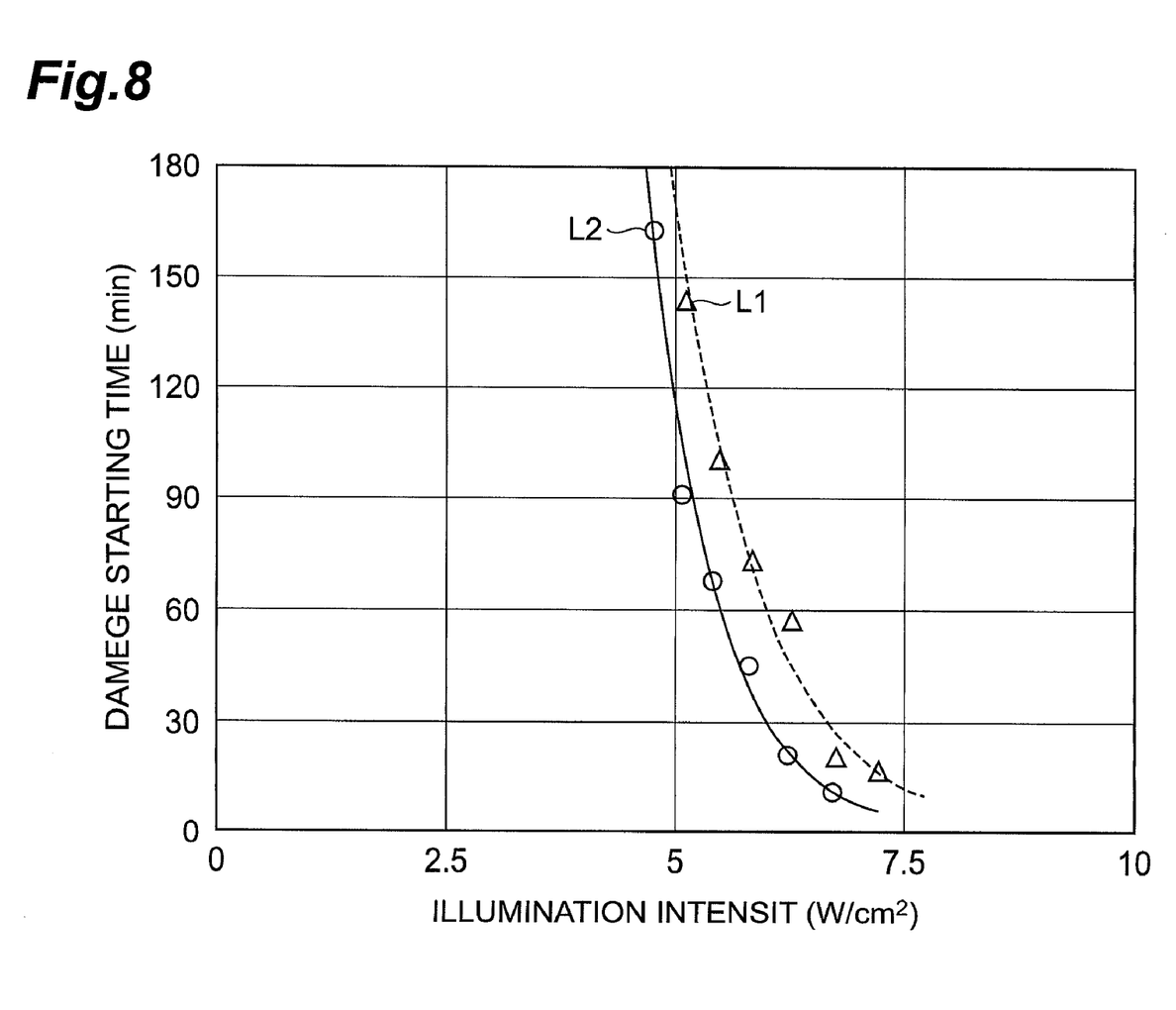
FIG. 8 shows experimental results of light resistance of the conventional reflective spatial light modulator and the reflective spatial light modulator according to the present invention.

FIG. 8 shows experimental results of light resistance of the conventional reflective spatial light modulator and the reflective spatial light modulator 1 according to the present invention. In FIG. 8, the abscissa indicates an illumination intensity (W/cm²) and the ordinate indicates a time (min) taken until damaging of the liquid crystal layer 5. As shown in FIG. 8, the damage starting time of the liquid crystal layer 5 with respect to the illumination intensity is longer with the reflective spatial light modulator 1 (curve L1) than with the conventional reflective spatial light modulator (curve L2) that does not include the transparent layer 6. Normally when a device is used, light is illuminated for a long time. Influences of multiphoton absorption thus accumulate according to the illumination time. Meanwhile, with the present embodiment, because the transparent layer 6 functions effectively, the light resistance of the reflective spatial light modulator 1 can be improved by disposition of the transparent layer 6.

MODIFIED EXAMPLE

Figure 9:
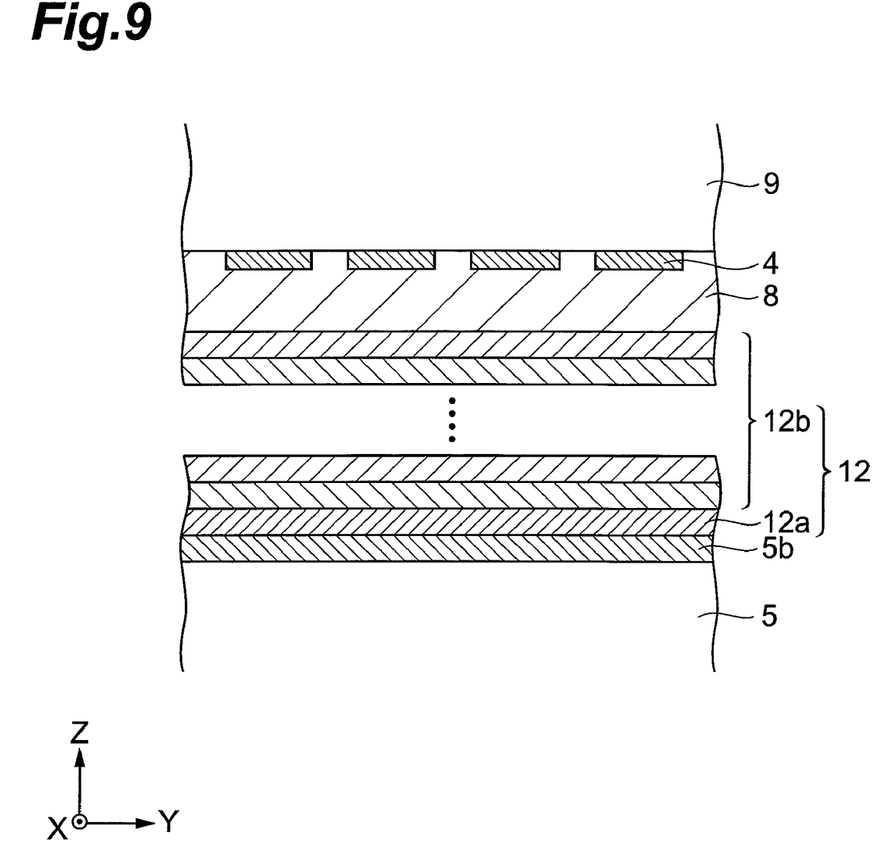
FIG. 9 is an enlarged view of a configuration of a dielectric multilayer film according to a modified example of the present invention.

FIG. 9 is a sectional side view of a configuration of a dielectric multilayer film 12 as a modification example of the above-described embodiment. The reflective spatial light modulator 1 according to the embodiment may include the dielectric multilayer film 12 shown in FIG. 9 in place of the transparent layer 6 and the dielectric multilayer film 7 shown in FIG. 1.

As shown in FIG. 9, the dielectric multilayer film 12 comprises a transparent layer 12a (a first layer that is a phase shift layer) in contact with an alignment film 4a, and a reflecting layer 12b (layer other than the first layer) in contact with the transparent layer 12a. The reflecting layer 12b co-operates with a light reflection action possessed by the top surfaces of the pixel electrodes 4 to reflect the light L at a high reflectance, for example, of over 99%. Preferably $SiO_2$ is mainly contained as a constituent material of the transparent layer 12a. Although a material in which $SiO_2$ and $TiO_2$ are laminated alternatingly can be cited as an example of a constituent material of the reflective layer 12b, the present example is not restricted in particular thereto, and changes can be made as suited, for example by employing $HfO_2$ in place of $TiO_2$, and employing $MgF_2$ in place of $SiO_2$.

Even with the present modification example with the above configuration, because the transparent layer 12a is formed between the liquid crystal layer 5 and the reflecting layer 12b, two-photon absorption due to superimposition of the incident light and the reflected light at the interface of the liquid crystal layer 5 can be lessened.

The reflective spatial light modulator 1 according to the present invention is not restricted to the above-described embodiment and various other modifications are possible. For example, although a thin film having $SiO_2$ as the constituent material is used as the transparent layer 6 in the above-described embodiment, a glass layer, an air layer, a liquid layer (matching oil), etc. may be used instead as the phase shift layer.

In accordance with the reflective spatial optical modulator according to the present invention, light resistance can be improved and damaging of the liquid crystal layer can be prevented.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A reflective spatial light modulator which has a light input/output surface and controls phases of an incident light, passing through said light input/output surface from a predetermined direction, and a reflected light, passing through said light input/output surface from a direction opposite that of the incident light, said reflective spatial light modulator further comprising:

a liquid crystal layer arranged at a position where the incident light having passed through said light input/output surface arrives, said liquid crystal layer being configured by filling a liquid crystal comprised of a light modulating material into a space between two alignment films which are positioned in succession along a propagating direction of the incident light having passed through said light input/output surface;

a reflecting layer arranged at a side opposite said light input/output surface with respect to said liquid crystal layer, said reflecting layer reflecting the incident light, which has passed through said liquid crystal layer, as reflected light propagating in the direction opposite the propagating direction of the incident light; and a phase shift layer arranged between said liquid crystal layer and said reflecting layer, said phase shift layer shifting phases of the incident light and the reflected light at an alignment film-liquid crystal interface in said liquid crystal layer.

2. A reflective spatial light modulator according to claim 1, wherein said phase shift layer has an optical film thickness of no less than a wavelength of the incident light.

3. A reflective spatial light modulator according to claim 1, wherein, when $\tau$ is a pulse width of the incident light and c is a speed of light, said phase shift layer has an optical film thickness of no less than $(\tau \times c)/30$.

4. A reflective spatial light modulator according to claim 1, wherein said phase shift layer and said reflecting layer constitute a part of a dielectric multilayer film in which three or more dielectric layers are laminated, said dielectric multilayer film being positioned so that a laminate direction of said dielectric layers is matched with the propagating direction of the incident light having passed through said liquid crystal, and wherein, of said dielectric layers in said dielectric multilayer film, an upper dielectric layer positioned at a side closest to said liquid crystal layer functions as said phase shift layer, and the other dielectric layers excluding said upper dielectric layer function as said reflecting layer.

* * * * *